(12) United States Patent
Ronchi

(10) Patent No.: US 6,209,707 B1
(45) Date of Patent: Apr. 3, 2001

(54) APPARATUS FOR ADJUSTING THE RELATIVE POSITION OF SIDE-WALLS FOR GUIDING CONTAINERS IN MACHINES FOR FORMING ARRAYS OF SAID CONTAINERS

(75) Inventor: Mario Ronchi, Cologno Monzese (IT)

(73) Assignee: Ronchipack S.r.l., Gessate (IT)

( * ) Notice: Subject to any disclaimer, the term of this patent is extended or adjusted under 35 U.S.C. 154(b) by 0 days.

(21) Appl. No.: 09/318,091

(22) Filed: May 25, 1999

(30) Foreign Application Priority Data

Jun. 3, 1998 (IT) .............................. MI98A1247

(51) Int. Cl.⁷ .................................. B65G 47/12
(52) U.S. Cl. ........................ 198/445; 198/836.3
(58) Field of Search ................. 198/445, 836.3

(56) References Cited

U.S. PATENT DOCUMENTS

| | | | | |
|---|---|---|---|---|
| 2,935,173 | * | 5/1960 | Cozzoli | 198/445 |
| 2,951,574 | * | 9/1960 | Craig | 198/836.3 |
| 3,289,867 | * | 12/1966 | Burke | 198/458 |
| 3,554,353 | * | 1/1971 | Raudat | 198/836.3 |
| 3,767,027 | * | 10/1973 | Pund et al. | 198/452 |
| 3,860,232 | * | 1/1975 | Martin | 198/458 |
| 3,986,598 | * | 10/1976 | Grantham | 198/445 |
| 4,216,855 | * | 8/1980 | Raudat | 198/836.3 |
| 4,432,189 | * | 2/1984 | Raudat | 53/497 |
| 4,536,118 | * | 8/1985 | Baba | 414/789.8 |
| 4,880,104 | * | 11/1989 | Evans et al. | 198/445 |
| 4,925,002 | * | 5/1990 | Williams | 198/445 |
| 4,932,514 | * | 6/1990 | Doppenberg | 198/445 |
| 5,038,917 | * | 8/1991 | Kronseder | 198/445 |
| 5,768,860 | * | 6/1998 | Weaver | 198/445 |
| 5,937,995 | * | 8/1999 | Hartness et al. | 198/445 |
| 6,000,526 | * | 12/1999 | Van Veldbuisen et al. | 198/445 |

* cited by examiner

Primary Examiner—Robert P. Olszewski
Assistant Examiner—Paul T. Chin
(74) Attorney, Agent, or Firm—Herbert Dubno

(57) ABSTRACT

Apparatus for adjusting the relative position of side-walls (11,11a,12,12a,13,13a) delimiting channels for receiving containers (2) in machines (1) for forming arrays of containers, the apparatus comprising actuating devices (21, 22,23) arranged in a substantially transverse direction with respect to the direction of feeding of the containers (2) and connected to the side-walls by associated coupling mechanism (61,62,63), a device (30) also being provided for operating the actuating devices (21,22,23).

13 Claims, 3 Drawing Sheets

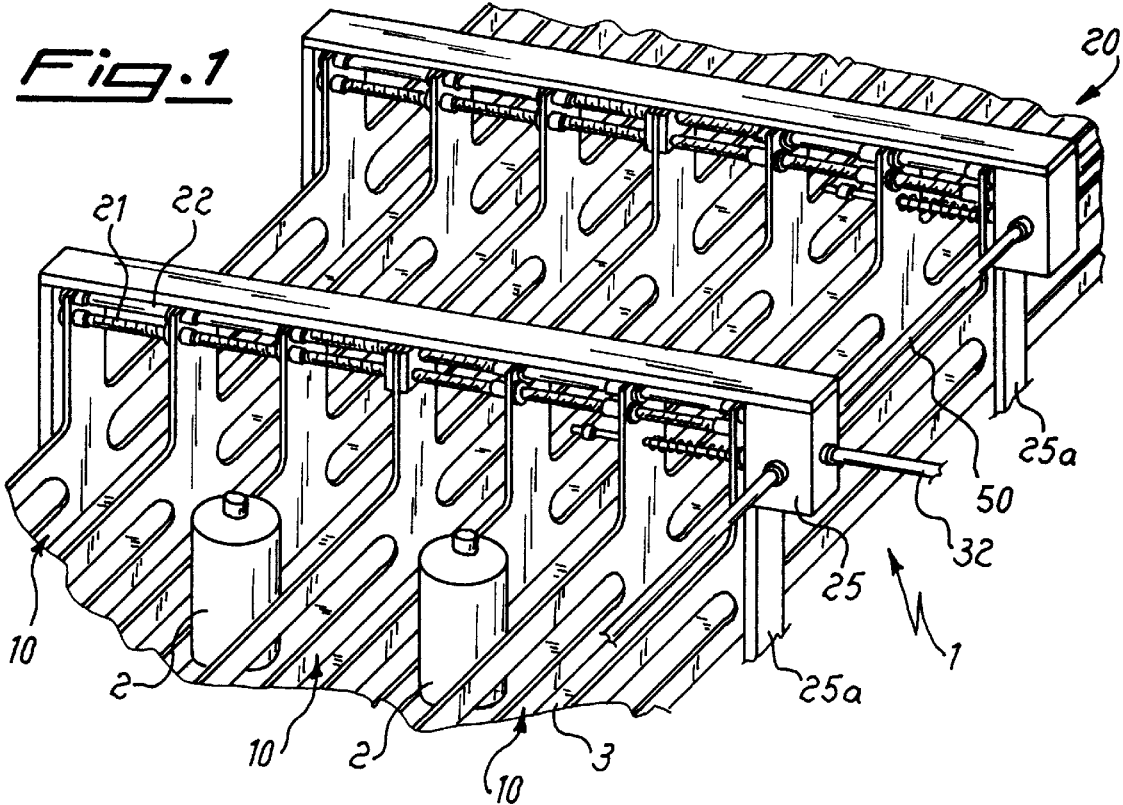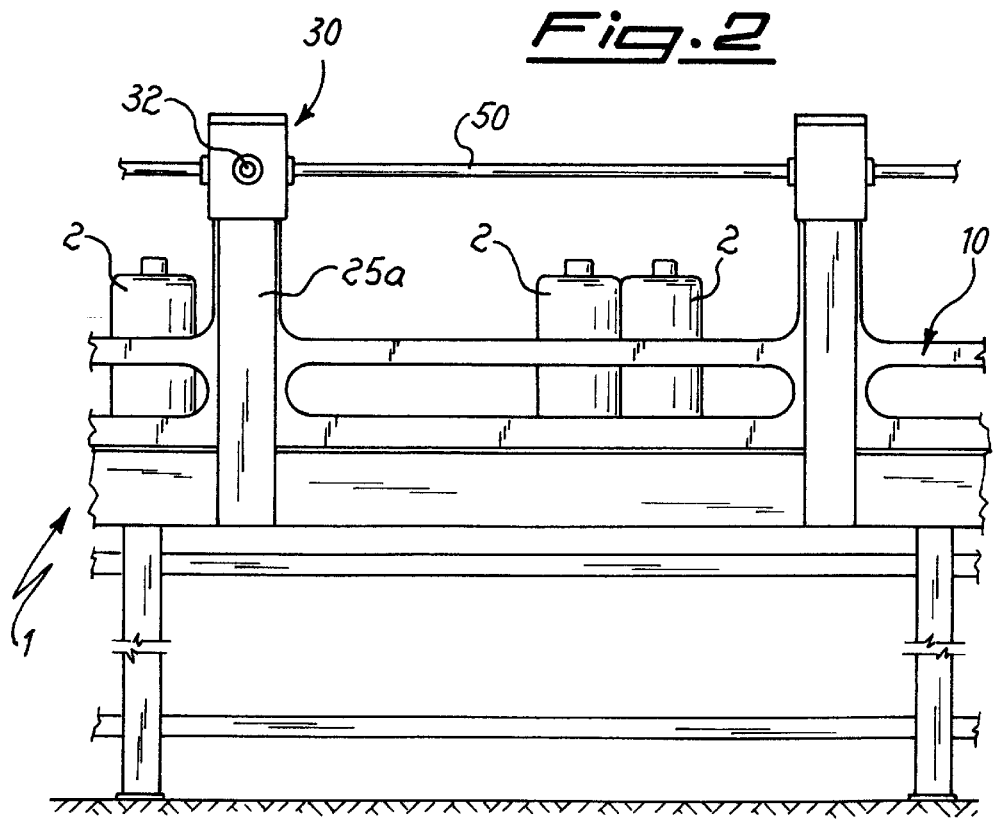

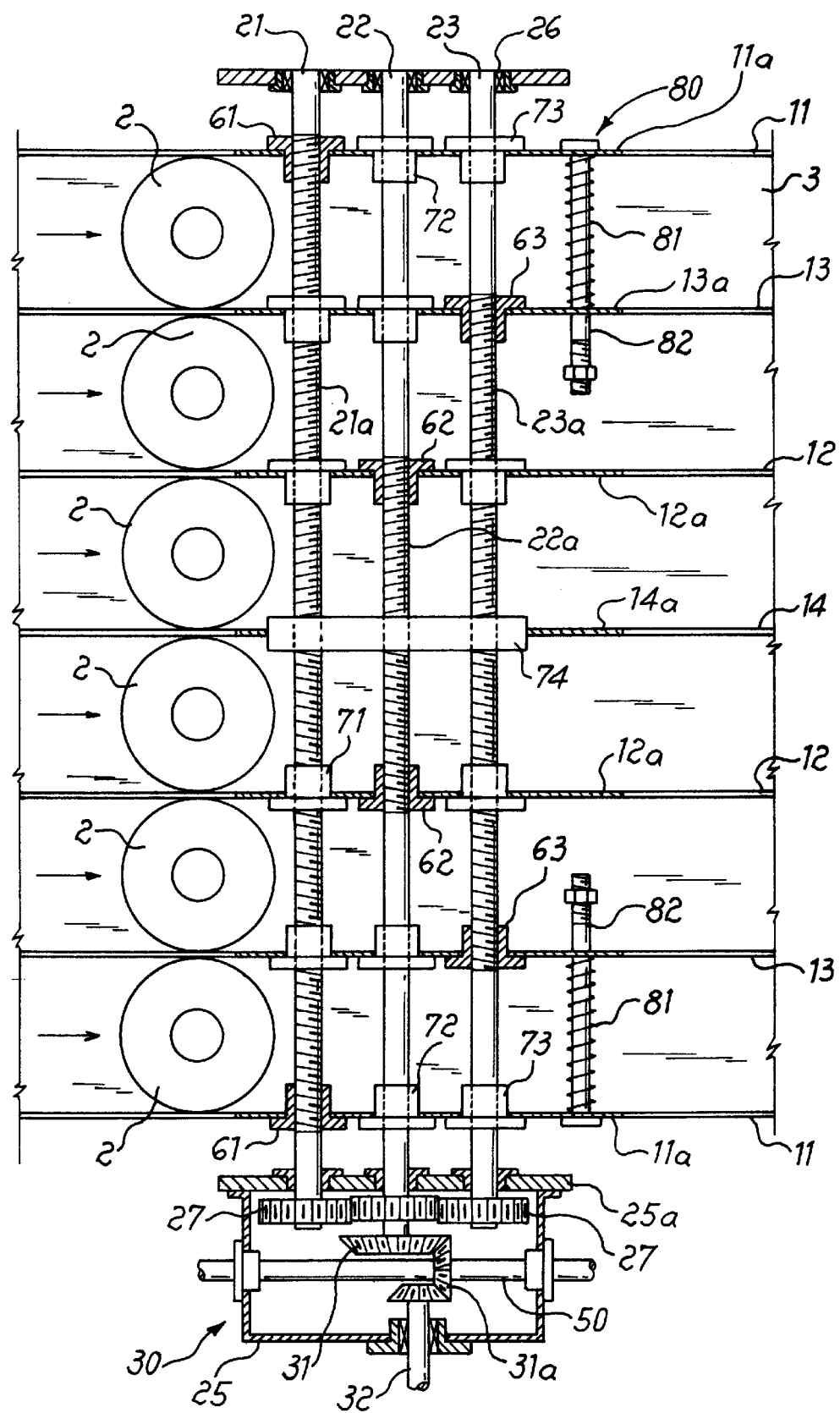

APPARATUS FOR ADJUSTING THE RELATIVE POSITION OF SIDE-WALLS FOR GUIDING CONTAINERS IN MACHINES FOR FORMING ARRAYS OF SAID CONTAINERS

FIELD OF THE INVENTION

The present invention relates to an apparatus for adjusting the relative position of side walls delimiting channels for receiving containers, in machines for forming arrays of said containers.

BACKGROUND OF THE INVENTION

It is known in the art of packaging containers of various shapes such as bottles, small receptacles and the like that there is the need to align the containers in arrays consisting of a predefined number of rows and columns depending on the dimensions of the packaging box into which they must be inserted by means of a transportation head which removes the array of containers and places it in the box.

Automatic machines which are designed for this purpose are also known. These machines are substantially divided into two parts which are arranged alongside and synchronized with each other. In the first part the arrays of containers are formed, while in the second part the box to be filled is formed, the connection between the parts being effected by the head for gripping and inserting the array, already formed, into the box.

More particularly, formation of the rows is performed by a longitudinal belt for feeding containers arranged in a single line, which is provided with deviation means movable in a transverse direction with respect to the longitudinal direction of feeding of the containers and designed to cause channelling of the individual containers into receiving channels arranged above an auxiliary conveyor belt onto which the containers for filling in succession each channel are unloaded until the number of rows and columns corresponding to the array to be boxed has been formed.

The channels are delimited by longitudinal side walls which are movable in the transverse direction with respect to the direction of feeding of the containers, so as to allow the adjustment of the width of each channel and hence the overall number of channels which can be formed, in relation to the dimensions of the bottle being fed.

Although these machines perform their functions, they have drawbacks, among others, in that the side walls are individually attached by means of associated vertical arms to transverse guides inside which the free end of the arms may slide so as to allow transverse displacement thereof.

Such displacement is performed manually and for each longitudinal side wall section. In view of the fact that the machines may have very substantial longitudinal dimensions and therefore a large number of side walls to be displaced transversely and aligned in the longitudinal direction and that the number of parallel side walls for each section may also be large so as to allow the formation of a large number of lines corresponding to containers with small dimensions, it can be understood how manual adjustment for each side wall results in machine down times which are unacceptable for the production outputs required.

OBJECTS OF THE INVENTION

It is an object of the invention to provide an apparatus which allows the simultaneous adjustment of the position, in the transverse direction, of side walls delimiting channels for receiving containers in machines for forming arrays of containers ready for boxing.

It is another object to provide such an apparatus which should be easy and economical to install and will allow adjustment of the interaxial distance of the side walls also in those cases where the large transverse dimension of the container allows the formation of a small number of channels, preventing the use of all the side walls present and thereby resulting in the temporary need for some of them to be arranged outside the path of the bottles.

SUMMARY OF THE INVENTION

These technical problems are solved according to the present invention by an apparatus for adjusting the relative position of side walls delimiting channels for receiving containers, in machines for forming arrays of the containers, the apparatus comprising actuating devices arranged in a substantially transverse direction with respect to the direction of feeding of the containers and connected to the side walls by associated coupling means, means for operating the actuating means also being provided.

BRIEF DESCRIPTION OF THE DRAWING

The above and other objects, features, and advantages will become more readily apparent from the following description, reference being made to the accompanying drawing in which:

FIG. 1 shows a perspective view of a machine for forming arrays with an apparatus for adjusting the position of the side walls according to the invention;

FIG. 2 shows a side view of the machine according to FIG. 1;

FIG. 3 shows a partially sectioned plan view of the apparatus according to the invention.

SPECIFIC DESCRIPTION

Figure 4:
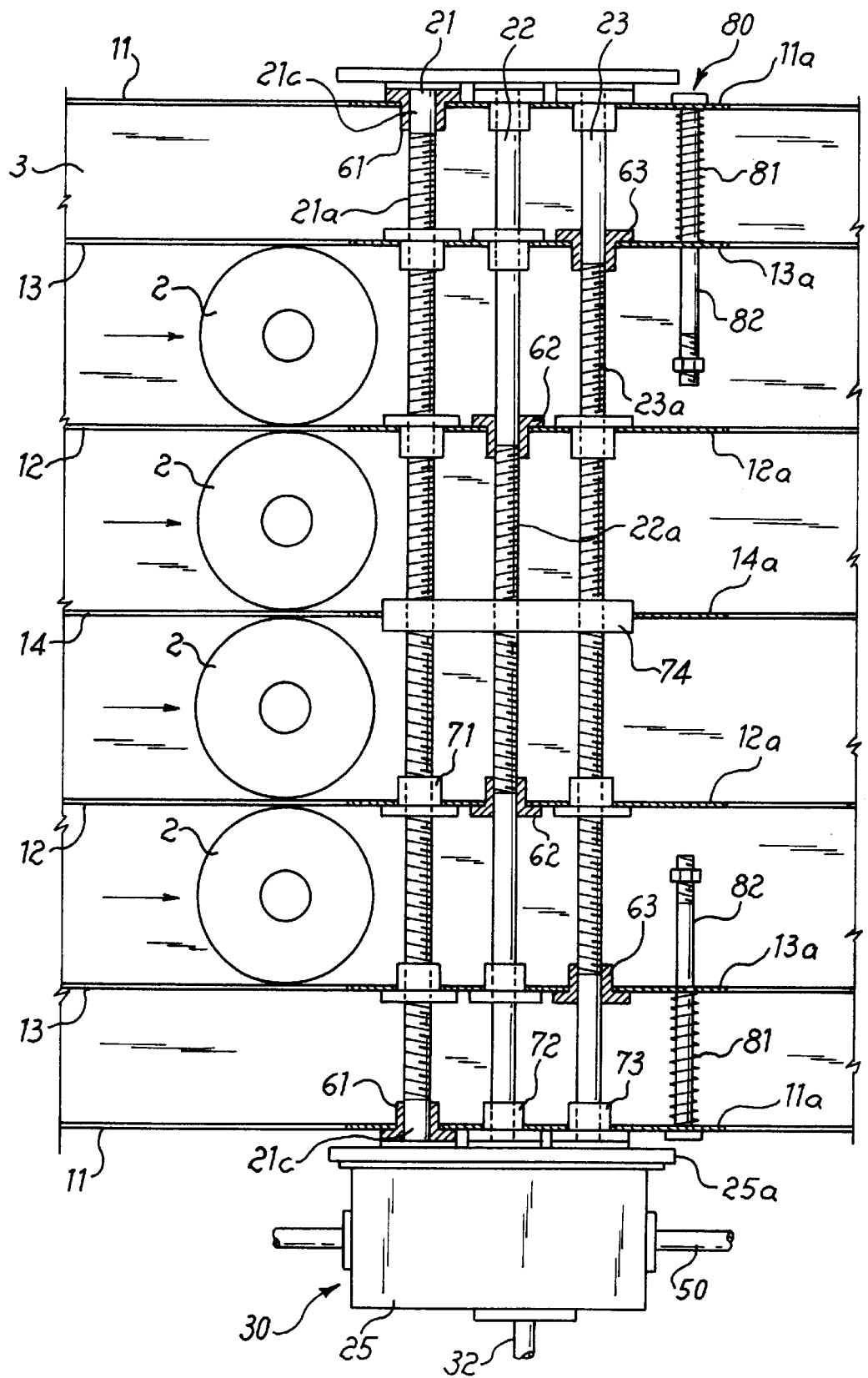
FIG. 4 shows a plan view similar to that of FIG. 3 with a detail of the means for neutralizing the side wall with respect to the associated actuating shaft.

As shown, a machine 1 for forming arrays of containers 2 comprises, among other things, a conveyor belt 3 transporting the containers 2 which move in the longitudinal feeding direction in parallel lines defined by channels delimited by side walls 10 which have extensions 11 substantially perpendicular to the plane of the conveyor, the upper free end of which is attached to the apparatus 20 for adjusting the position of the side walls.

In greater detail (FIG. 3) the adjusting apparatus 20 comprises three shafts 21, 22, 23 arranged parallel to each other and located at the vertices of an equilateral triangle.

The shafts extend transversely of the direction of feeding of the conveyor belt 3 and at a location above the latter, so as to be able to be coupled with the free ends of the vertical arms 11 of the side walls 10, as will emerge below. Preferably the shafts are contained inside an associated protective casing 25 supported by uprights 25a.

Each shaft is mounted on corresponding bearings 26 and has at one of its ends gear wheels 27 meshing with each other so as to transmit and synchronize the movement imparted by a device 30 consisting of a bevel gear 31 mounted on the central shaft 22 and arranged such as to allow engagement with a drive 32 which, in the example, is coaxial with the central shaft 22.

The drive 32 may be associated with manual or motorized actuating means which are known per se and therefore not illustrated.

Since, as stated, the side wall sections 10 to be moved transversely may be numerous, each bevel-gear transmission 31a has a through-seat for fixing to a further shaft 50 arranged longitudinally and connecting two successive devices 30 for actuating other groups of shafts 21, 22, 23.

In order to facilitate alignment of the individual longitudinal shafts 50, universal joints (not shown) may be provided, the joints being arranged between the shafts 50 and the corresponding casings 30 into which its opposite ends are inserted.

As illustrated in FIG. 3, each shaft 21, 22, 23 is provided with screw threads 21a, 22a, 23a which extend symmetrically on opposite sides of the center of the shaft over a predetermined section, the length of which will be clarified below.

Each thread extends moreover in opposite senses along the two sections which are respectively on the opposite sides of the center.

Each shaft 21, 22, 23 is threaded into female-thread bushes 61, 62, 63 and passes through internally smooth bushes 71, 72, 73 which are integral with respective arms 11a, 12a, 13a of associated side walls 11, 12, 13 symmetrically arranged on the opposite side of a fixed central side wall 14 which in turn has a smooth bush 74.

In this way each arm 11a, 12a, 13a of the side walls 11, 12, 13 is coupled, by means of the female thread of the bush 61, 62, 63, with the threaded section 21a, 22a, 23a of the associated shaft 21, 22, 23 and is only guided on the remaining shafts by means of the other smooth bushes 71, 72, 73; similarly, the arm 14a of the fixed side wall 14 which must remain fixed is only guided on the three shafts of the associated bush 74. In this way each thread 21a, 22a, 23a moves symmetrically, in either direction, depending on the direction of rotation of the associated shaft, the associated vertical arm 11a, 12a, 13a of a pair of side walls 11, 12, 13 symmetrically arranged with respect to the fixed side wall 14, adjusting at the same time the relative distance thereof with respect to the latter. In a preferred embodiment and for the purposes of obtaining correct positioning of the pairs of side walls 11, 12, 13 with respect to the fixed central side wall 14, the threads 23a and 21a will have a pitch which is respectively double and triple the pitch of the thread 22a.

In addition, it is envisaged (FIG. 4) that the apparatus comprises means 80 bringing out of the feeding path of the containers 2 those side walls which, on account of the large dimensions of the container 2 itself, may become superfluous, it not being possible to provide all the potentially available channels in relation to the number of side walls present.

These means 80 comprise a spring 81 and a tie-rod 82 arranged between the outermost side walls 11 and 13.

In greater detail, the spring 81 has a thrusting action so as to keep the two side walls at a distance, while the tie rod is fastened to the outermost side wall 11 and passes into a hole in the adjacent side wall.

In this way the outermost side wall 11 of each pair is pushed by the adjacent side wall 13 by means of the spring 81 towards the end of the respective shaft 21 which has an unthreaded section 21c, where the associated threaded bush 61 is located, the latter thus being idle with respect to rotation of the shaft itself.

When it is required to bring the side wall 11 back into the working position, the displacement of the adjacent side wall 13 towards the center actuates the tie-rod 82 which draws with it the side wall 11 until the associated thread bush 61 meshes again with the corresponding threading 21a of the shaft, thus returning into the normal operating conditions.

It is therefore obvious that the apparatus according to the invention allows the adjustment, automatically and simultaneously, of all the side walls delimiting the channels of the containers 2 to be arranged in arrays ready for boxing, also allowing this adjustment to be obtained both in the case of use of all the available side walls and in the case where the dimensions of the containers result in the need for neutralization of some of them, arranging them temporarily outside the path of the bottles themselves.

It is envisaged, moreover, that operation of the actuating shaft may be performed manually or by means of motorized devices provided with or without means for programming and controlling the relative position of the side-walls themselves.

What is claimed is:

1. A side wall assembly comprising:

a stationary side wall extending along a container path and a plurality of symmetrically disposed pairs of movable side walls parallel to said stationary side wall and delimiting channels along said path for respective rows of containers, the movable side walls of each pair being disposed on opposite sides of said stationary side wall, said pairs of movable side walls including an outermost pair of side walls and another pair of side walls lying inwardly of said outermost pair;

respective shafts assigned to each of said pairs of movable side walls, extending transversely of said path and of said side walls and operatively connected to the respective pair of movable side walls for transversely displacing the respective pair of movable side walls to adjust a width of said channels, each of said shafts having oppositely threaded portions on opposite sides of said stationary side wall;

respective female-thread bushes engaging the threaded portions of each of said shafts and secured to the movable side walls of the pair of movable side walls assigned to each shaft;

smooth guide bushes on movable side walls traversed by the shafts assigned to other pairs of movable side walls and on said stationary side walls and receiving said shafts to allow free rotation thereof; and a drive for rotating said shafts to symmetrically displace said movable side walls relative to said stationary side wall.

2. The apparatus defined in claim 1 wherein said shafts are of a number equal to the number of pairs of movable side walls.

3. The apparatus defined in claim 1 wherein centers of said shafts coincide with said stationary side wall.

4. The apparatus defined in claim 1 wherein the pitches of the threaded portions are whole multiples of a reference pitch.

5. The apparatus defined in claim 1 wherein said drive for rotating said shafts includes gearing connecting said shafts together for synchronization of rotation of said shafts.

6. The apparatus defined in claim 5 wherein said drive includes at least one bevel gear connected to said gearing.

7. The apparatus defined in claim 5 wherein said drive includes a 90° bevel gear transmission.

8. The apparatus defined in claim 1 wherein said shafts form a group with a respective drive and a plurality of said groups of said shafts are provided along said side walls with respective drives, said drives being interconnected.

9. The apparatus defined in claim 1 wherein said drive is manually operable.

10. The apparatus defined in claim 1 wherein said drive is motorized.

11. The apparatus defined in claim 1, further comprising neutralizing means for decoupling at least the outermost pair of said walls from the respective shaft.

12. The apparatus defined in claim 11 wherein said neutralizing means includes a spring braced between a side wall of said outermost pair and a side wall of said other pair.

13. The apparatus defined in claim 11 wherein said neutralizing means includes a section of a respective shaft devoid of threading at opposite ends thereof.

* * * * *